United States Patent
Manusrungsri et al.

(10) Patent No.: US 12,041,957 B2
(45) Date of Patent: Jul. 23, 2024

(54) ASSEMBLY FOR ACCESSING COCONUT WATER IN COCONUT

(71) Applicant: K Fresh Co., Ltd, Samutprakarn (TH)

(72) Inventors: Kemtas Manusrungsri, Samutprakarn (TH); Waraporn Manusrungsri, Samutprakarn (TH)

(73) Assignee: K FRESH CO., LTD, Samutprakarn (TH)

( * ) Notice: Subject to any disclaimer, the term of this patent is extended or adjusted under 35 U.S.C. 154(b) by 0 days.

(21) Appl. No.: 17/292,876

(22) PCT Filed: Nov. 23, 2018

(86) PCT No.: PCT/TH2018/000052
§ 371 (c)(1),
(2) Date: May 11, 2021

(87) PCT Pub. No.: WO2020/106224
PCT Pub. Date: May 28, 2020

(65) Prior Publication Data
US 2021/0401027 A1    Dec. 30, 2021

(51) Int. Cl.
A23N 5/03    (2006.01)
A47J 19/02   (2006.01)

(52) U.S. Cl.
CPC ............... *A23N 5/03* (2013.01); *A47J 19/02* (2013.01)

(58) Field of Classification Search
CPC .... A23N 5/03; A23N 1/00; B67B 7/26; A23L 2/04
See application file for complete search history.

(56) References Cited

U.S. PATENT DOCUMENTS 4,264,392 A * 4/1981 Watt ................ B29C 66/432
                                              156/244.11
4,475,670 A * 10/1984 Rutter ............. B65D 77/067
                                              222/105
(Continued)

FOREIGN PATENT DOCUMENTS

CN    103732085 A    4/2014
CN    205585904 U *  9/2016 ............. A47J 43/26
(Continued)

OTHER PUBLICATIONS

CN-108392102-B Machine Translation (Year: 2020).*
(Continued)

*Primary Examiner* — Michael W Hotchkiss
(74) *Attorney, Agent, or Firm* — Muncy, Geissler, Olds & Lowe, P.C.

(57) ABSTRACT

An assembly (010) for accessing coconut water in a coconut has a plunger (011) for puncturing the germination pore of the coconut thereby permits the access of the coconut water inside the coconut. The assembly (010) comprises a plunger (011) having a plunger collar (111) perpendicularly mounted to a plunger lance (211), a lid (012) having a lid bore (112) for receiving and housing a tip of the plunger lance (211) and a stopper clip (013) for holding the plunger lance (211) in order to prevent the tip of the plunger lance (211) in the lid bore (112) from puncturing a germination pore of the coconut, wherein the lid (012) of the assembly (010) is placed and fixed on the germination pore of the coconut by a fixing mean.

16 Claims, 3 Drawing Sheets

A

B    C    D

(56) References Cited

U.S. PATENT DOCUMENTS

| | | | | | |
|---|---|---|---|---|---|
| 4,602,725 | A | * | 7/1986 | Malpas | B65D 77/067 222/83.5 |
| 4,884,705 | A | * | 12/1989 | Debetencourt | B65D 47/242 215/250 |
| 5,438,954 | A | * | 8/1995 | Phelps | A01K 45/007 119/6.8 |
| 5,482,176 | A | * | 1/1996 | Maietta | B65D 77/067 220/277 |
| 8,353,428 | B2 | * | 1/2013 | Pritchard | B67D 3/0045 222/105 |
| 8,561,846 | B2 | * | 10/2013 | Hauner | B67B 7/26 222/153.01 |
| 8,709,519 | B1 | | 4/2014 | dePoo | A23N 5/08 426/489 |
| 8,740,030 | B2 | * | 6/2014 | Purdy | A62B 3/005 225/103 |
| 9,049,885 | B2 | * | 6/2015 | dePoo | B26D 3/26 |
| 10,179,677 | B2 | * | 1/2019 | Stever | B65D 37/00 |
| 10,194,763 | B2 | * | 2/2019 | Sowieja | B67B 7/24 |
| 10,961,101 | B2 | * | 3/2021 | Clark | A47G 21/18 |
| 2005/0011909 | A1 | * | 1/2005 | Hanell | B67B 7/26 222/83 |
| 2012/0211519 | A1 | * | 8/2012 | Hauner | B67D 3/045 222/81 |
| 2014/0044848 | A1 | * | 2/2014 | dePoo | A23L 19/03 426/489 |
| 2016/0281040 | A1 | * | 9/2016 | Rosen | C12C 11/11 |
| 2016/0345619 | A1 | * | 12/2016 | Zaldivar | A47J 19/02 |
| 2017/0209003 | A1 | * | 7/2017 | Quintero | A47J 43/26 |
| 2017/0251846 | A1 | * | 9/2017 | Sowieja | B67B 7/28 |
| 2017/0339999 | A1 | * | 11/2017 | Zaldivar | A47J 43/26 |
| 2019/0218087 | A1 | * | 7/2019 | Clark | A47G 19/22 |

FOREIGN PATENT DOCUMENTS

| | | | | | |
|---|---|---|---|---|---|
| CN | 207511123 | U | | 6/2018 | |
| CN | 209284250 | U | * | 8/2019 | |
| CN | 108392102 | B | * | 9/2020 | A23N 5/03 |
| DE | 202008009463 | U1 | * | 10/2008 | A23N 5/03 |
| GB | 2323549 | A | * | 9/1998 | A23N 5/03 |
| TW | 201620425 | A | * | 6/2016 | A23N 5/03 |
| TW | 201620425 | A | | 6/2016 | |
| WO | 2014129984 | A1 | | 8/2014 | |
| WO | 2014146031 | A1 | | 9/2014 | |
| WO | 2014146037 | A1 | | 9/2014 | |
| WO | WO-2014146031 | A1 | * | 9/2014 | A23L 2/04 |

OTHER PUBLICATIONS

CN-205585904-U Machine Translation (Year: 2016).*
DE-202008009463-U1 Machine Translation (Year: 2008).*
TW201620425A Machine Translation (Year: 2016).*
CN-209284250-U Machine Translation (Year: 2019).*
International Search Report & Written Opinion dated Aug. 21, 2019 from PCT Application No. PCT/TH2018/000052.

* cited by examiner

ASSEMBLY FOR ACCESSING COCONUT WATER IN COCONUT

TECHNICAL FIELD

The present invention relates to an assembly for accessing coconut water in a coconut and more particularly to such assembly having the plunger for puncturing the germination pore of the coconut thereby permitting the access of the coconut water inside the coconut.

BACKGROUND ART

The young fruit of the coconut is technically a large drupe composed of a thin outer layer called exocarp; a thick and fibrous middle layer called a mesocarp, and a hard inner layer called an endocarp that surrounds a large seed. The endocarp contains three germination pores at one end, one of which the sprouting coconut palm grows through. The "meat" of the seed is endosperm tissue and a small, cylindrical embryo is embedded in this nutritive tissue just opposite the functional germination pore. The seed is surrounded by an outer layer called the seed coat or testa. This is the material that adheres to the white "meat" or endosperm when it is removed from the endocarp shell. "Coconut water" is multinucleate liquid endosperm that has not yet developed into solid tissue composed of cells. Many people enjoy the health benefits, nutrients, and taste of virgin coconut water straight from the fresh husked young coconut, roasted or boiled aromatic coconut.

WO2014129984A1 discloses an easy-to-open roasted or boiled aromatic coconut comprising a coconut from which the husk was removed until a clean shelled coconut is obtained and groove like on the shell of the coconut characterized ¾ that said groove line is at least one converged groove line located at the bottom; of the shell of the coconut and that said groove line is made by laser engraving using a laser engraver. The easy-to-open roasted or boiled aromatic coconut further comprises an opening means fixed within one converged groove line, near the groove line. The consumers can open the coconut shell by pulling the opening means such as a pull-ring. In case where at least one converged groove line is a large circle groove and a small circle groove wherein the pull-ring fixed near the small circle groove, this allows the coconut shell within the small circle groove to be opened, revealing the coconut meat inside. Through this small hole, the consumer can insert a tube to drink the coconut water arid when the juice is drunk up, the consumer can easily open the coconut shell further in order to eat the coconut meat by pulling the coconut shell within the large circle groove off by hand.

WO2014146037A1 discloses systems and methods associated with installing a valve accessing and removing liquid from within a coconut. This process involves aspects of installing a valve, wherein the valve may include a plunger constructed and arranged to pierce a coconut shell Among other things, innovations herein may involve aspects related to installation a valve with flange and/or grommet type structures constructed and arranged to pierce a coconut husk and to stop insertion of the plunger into the coconut at a predetermined point.

Coconut valves of WO2014146037A1 are inserted into coconuts having a tooled aperture placed through or within the coconut wall having a predetermined diameter so that a valve plug seats within said aperture with a valve plug collar substantially engaging the wall of the aperture. The valve plug may include a valve plug bore for receiving a plunger sleeve having a plunger sleeve bore with a based positioned plunger sleeve membrane that seals the coconut's contents until a plunger stopper having a plunger-stopper lance and plunger-stopper lance tip is used to puncture a plunger sleeve membrane, thereby providing access to the coconut water contained within the coconut. The plunger-stopper may be tethered to the plunger sleeve. The plunger-stopper may provide access to the coconut's contents and also serves as a stopper to seal any remaining coconut contents for future use, as the plunger-stopper may seal the plunger sleeve bore.

In the production of the Easy-to-open roasted or boiled aromatic coconut and the coconut with valve plug according to the prior arts, the shell of the coconut is made to have tooled aperture to install the pulling-ring or plug valve. This may cause the coconut shell to be broken and the coconut meat under the broken coconut shell may be exposed to the contaminants and consequently rotten.

SUMMARY OF INVENTION

It is one of the objects of the present invention to provide an assembly that can be readily and easily inserted through the coconut layers with relatively small force puncture through the germination pore of the coconut permitting the consumer to access the coconut water inside. In addition, utilization of the assembly according to the invention does not wound or interfere the intact of the shell of the coconut to reduce the risk of contamination.

Another object of the invention is to provide not only the assembly of such which is inexpensive to manufacture but also to maintain its effectiveness.

Another object of the invention will be mentioned in the following part of the specification, wherein detailed description is for the purpose of fully disclosing the embodiments without placing limitations thereon.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A represents the side views of the assembly of the present invention. FIGS. 1B-1D represent each component of the assembly of the present invention.

FIGS. 2A-2D represent the side, top and perspective views of the assembly of the present invention, respectively.

FIGS. 3A-3D represent steps of preparing a coconut having an assembly for accessing coconut water of the coconut of the present invention.

Unless otherwise indicated, illustrations in the figures are not necessarily drawn to scale.

DESCRIPTION OF EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention which are too numerous to be listed but that all that fit within the scope of the invention. Also, singular words should be read as plural and vice versa where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "a mean" is a reference to one or more means and may include subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Figure 1:
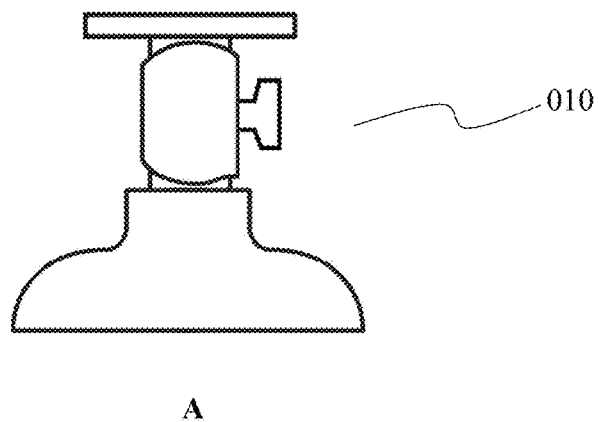
FIG. 1 represents the side views of one embodiment of the present invention.
Figure 1:
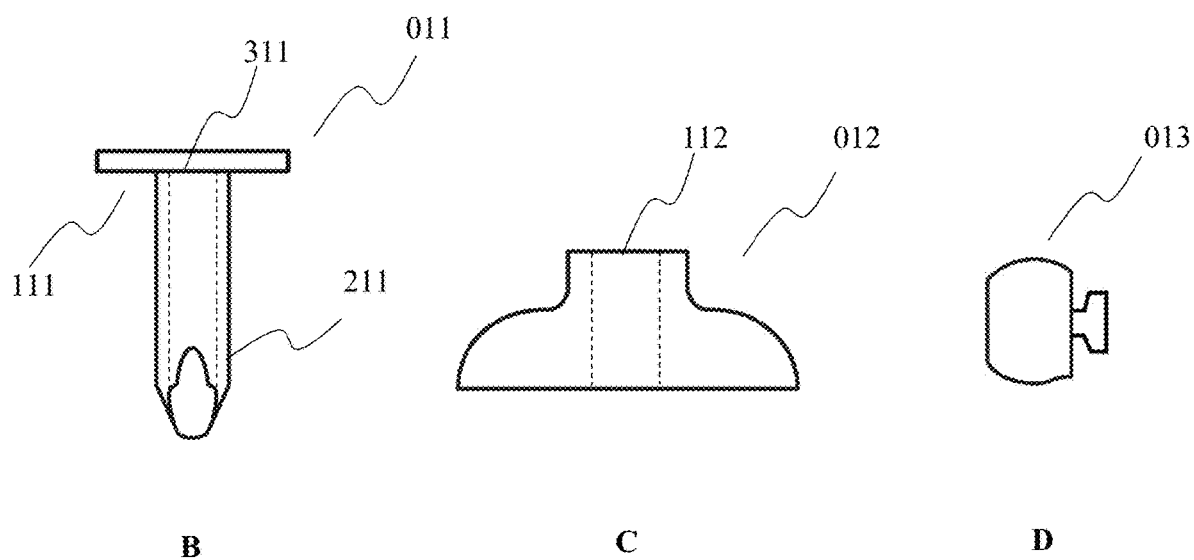

Referring to FIG. 1, where one embodiment of the present invention is referred to. The assembly 010 for accessing coconut water of the coconut comprises;

a plunger 011 having a plunger collar 111 perpendicularly mounted to a plunger lance 211;

a lid 012 having a lid bore 112 for receiving and housing the tip of the plunger lance 211; and a stopper clip 013 for holding the plunger lance 211 in order to prevent the tip of the plunger lance 211 in the lid bore 112 from puncturing the germination pore of the coconut.

The lid 012 is placed and fixed on the germination pore of the coconut by a fixing mean.

The plunger of the assembly according to the present invention has the plunger collar at one end of the plunger. The plunger collar may be a small knob or disk perpendicularly mounted to the blunt end of the elongated cylindrical plunger lance. The other end of the plunger lance is the pointed tip for piercing or puncturing the germination pore through the coconut layers of the coconut layers of the coconut.

The plunger may have a plunger bore 311 where a straw can be inserted through.

The plunger may have a length of at least 2, preferably 2-5 cm. The plunger collar may have a diameter of at least 0.5 cm, preferably 0.5-5 cm. The plunger lance may have the length of at least 2 cm, preferably 2-5 cm and the diameter of at least 0.5 cm, preferably 0.5-1.5 cm. The plunger bore may have the diameter of at least 0.4, preferably 0.4-2 cm.

The lid of the assembly according to the present invention may be a cover having rounded top or hemispherical roof or ceiling shaped like half of a ball or dome. The lid of the assembly according to the present invention may be formed in the rectangular top shaped like dome. The lid can be hollow or solid. The lid may have the lid bore vertically centered for receiving the plunger lance.

The lid may have the diameter or width of at least 0.5 cm, preferably 0.5-5 cm and the high of at least 0.5 cm, preferably 0.5-3.5 cm.

The stopper clip of the assembly according to the present invention is any one of various devices that grip, clasp, hook or hold the plunger lance in order to prevent the tip of the plunger lance in the lid bore from puncturing the germination pore of the coconut.

The assembly according to the present invention can be made of any one of various materials e.g. biomaterial, wood, plastic, metal, wood, resin, stone, ceramic, fiber, glass, composite material or the combination thereof.

The fixing mean for attaching the assembly of the present invention on the germination pore of the coconut including adhesive, adhesive tape, wrapping material, fastening material applied to fix the lid and entire assembly on the germination pore of the coconut without penetrating, destroying or interfering the shell of the coconut.

Figure 2:
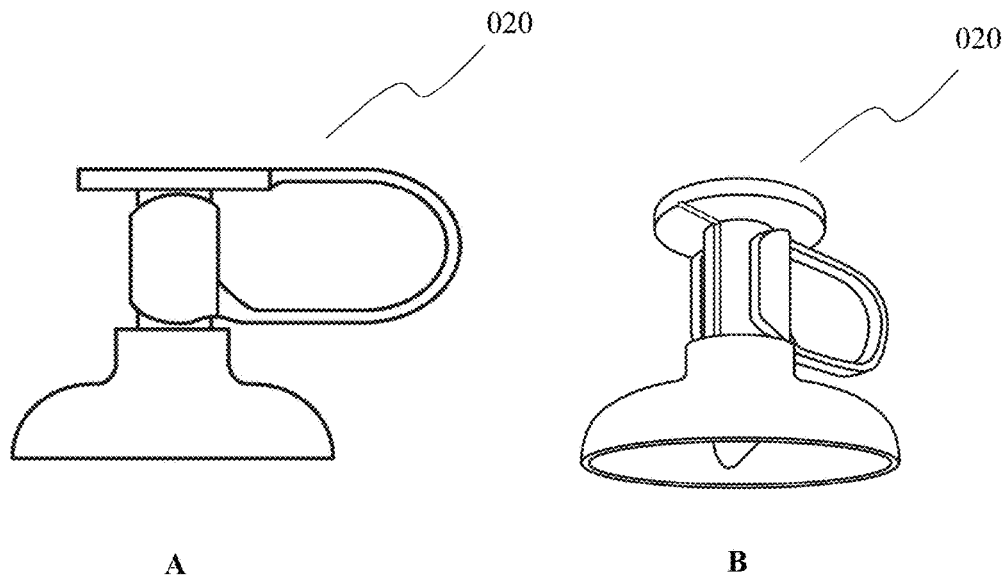
FIG. 2 represents side, top and perspective views of one embodiment of the present invention.
Figure 2:
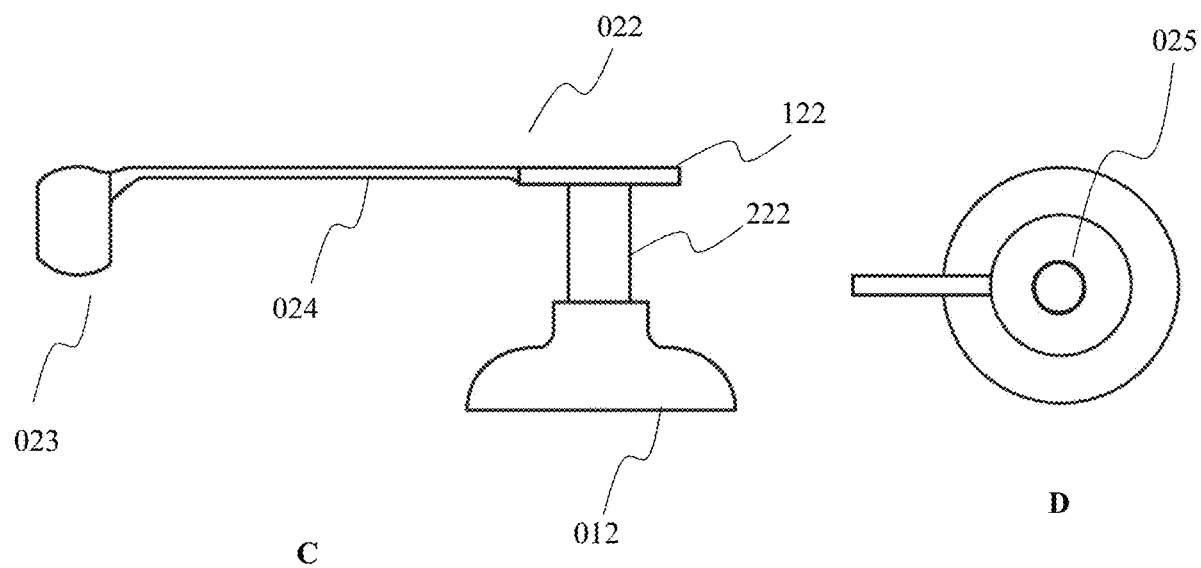

Referring to FIG. 2, where one embodiment of the present invention is referred to with numeral 020. The assembly 020 for accessing coconut water of the coconut comprises:

the plunger 922 having a plunger collar 122 perpendicularly mourned to a plunger lance 222;

the lid 012 having a lid bore 112 for receiving the tip of the plunger lance 222; and the stopper clip 923 for holding the plunger lance 222 in order to prevent the tip of the plunger lance 222 in the lid bore 112 from puncturing the shell of the coconut. The stopper clip 023 is tethered to the plunger collar 122 of the plunger 022 by a line 024. The lid 012 is placed and fixed on a germination pore on the shell of the coconut by a fixing mean such that the plunger lance 222 can puncture the germination pore through the coconut meat inside the coconut.

Figure 3:
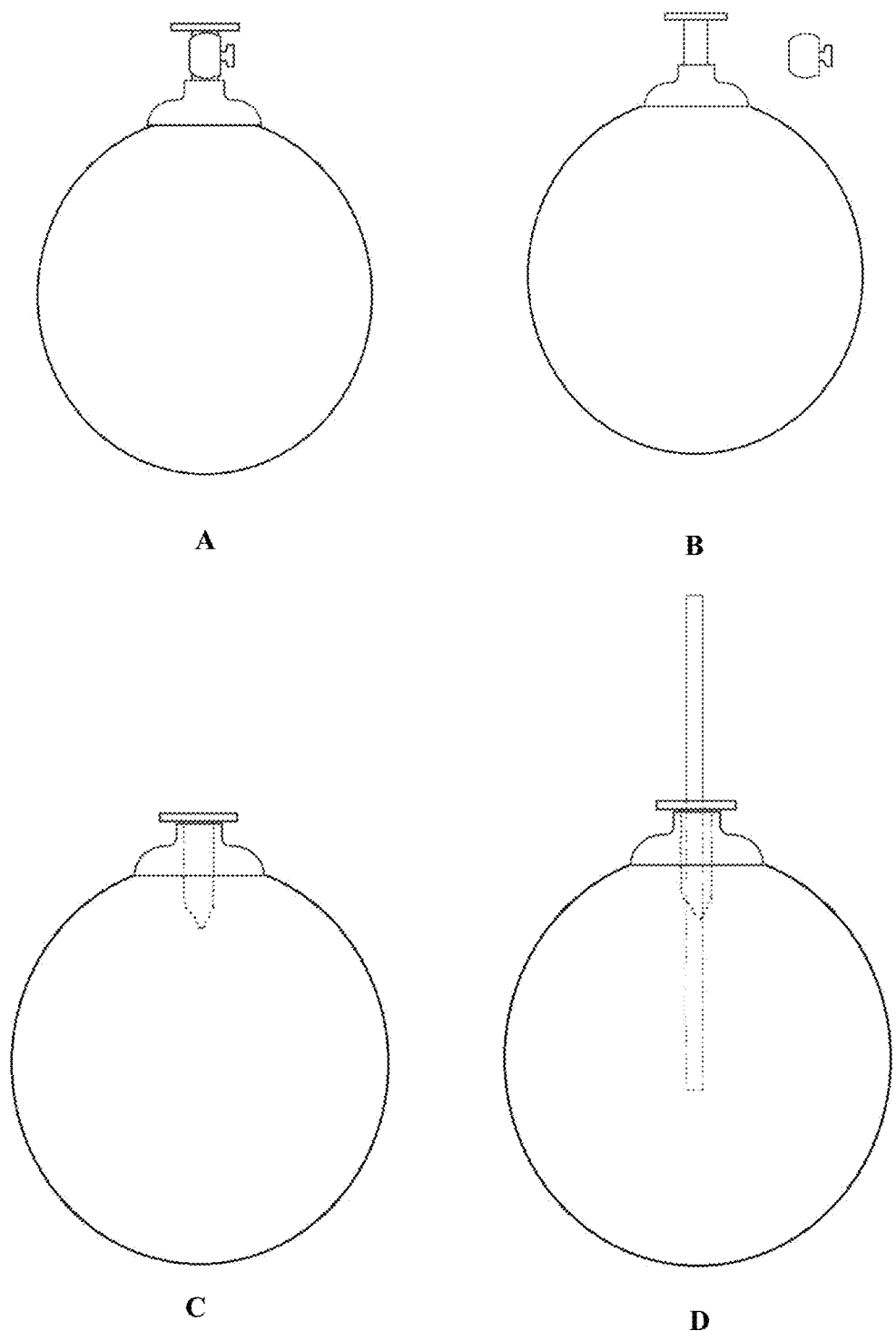
FIG. 3 is a pictorial representation of the assembly of the present invention as it is being utilized with a coconut to access the coconut water.

Referring to FIG. 3, the coconut having an assembly for accessing coconut water of the coconut is shown. The assembly of the present invention is installed on the coconut germination pore wherein the lid is placed and fixed on the germination pore of the coconut by a fixing mean.

Taking away or removing the stopper clip from the plunger lance, the user can push or press against the plunger collar with his/her force in order to drive or impel the plunger lance through the germination pore of the coconut for making a hole. The straw can be inserted through the plunger bore to access the coconut water inside the coconut.

As one embodiment of the present invention, a method for preparing a coconut having an assembly for accessing coconut water of the coconut comprises:

a. removing an outer husk covering the germination pores of the coconut;

b. placing the assembly of the invention on one of the germination pores of the coconut so that the plunger lance of the assembly is above the germination pore;

c. fixing the lid of the assembly on one of the germination pores of the coconut by a fixing mean.

The invention claimed is:

1. An assembly for accessing coconut water of a coconut comprising:
   a plunger having a plunger collar perpendicularly mounted to a plunger lance, the plunger collar extending outward from a longitudinal axis of the plunger lance at one end thereof, the plunger collar having an upper surface permitting a user to depress the upper surface to cause the plunger lance to penetrate the coconut, the plunger collar having a lower surface, extending from the plunger lance, a plane of the lower surface being perpendicular to the plunger lance;
   a plunger bore extending longitudinally through the plunger collar and the plunger lance, the plunger lance having a length sufficient to create a hole through the coconut by pressing the plunger lance into the coconut to a pressed position, the hole sufficient to pass the coconut water out of the coconut through the plunger bore while the plunger remains inserted in the pressed position, the plunger lance is configured to pierce a germination pore of the coconut after the lid is placed and fixed on the germination pore of the coconut;
   a lid having a lid bore for receiving and housing a tip of the plunger lance, the lower surface of the plunger collar directly contacting the lid when the plunger is fully inserted into the coconut through the lid, the lid having a lowermost surface of the lid resting on the coconut without penetrating into the coconut during use of the assembly to access the coconut water therein; and
   a stopper clip for holding the plunger lance in order to prevent the tip of the plunger lance in the lid bore from puncturing the coconut, wherein the lid of the assembly is placed and fixed on the coconut by a fixing means, the fixing means fixing the assembly on the coconut without the assembly penetrating, destroying or interfering with a shell of the coconut.

2. The assembly of claim 1, wherein the fixing means consists of at least one of an adhesive, an adhesive tape, a wrapping material, and a fastening material applied to fix the lid on the coconut without interfering with the shell of the coconut.

3. The assembly of claim 1, wherein the stopper clip is tethered to the plunger collar of the plunger.

4. The assembly of claim 1, wherein the plunger bore is configured to permit a straw to be inserted therethrough.

5. The assembly of claim 1, wherein the lid is dome-shaped having an opening in a top portion thereof, the opening including a tubular portion extending outward, away from an interior of the lid.

6. The assembly of claim 1, wherein the stopper clip is a tubular member, open on each of a first open end and a second open end, with a cut formed along a length thereof, from the first open end to the second end.

7. A coconut having an assembly for accessing coconut water of the coconut, the coconut comprising:
   a coconut showing a germination pore; and
   an assembly of claim 1 wherein the lid is placed and fixed on the germination pore of the coconut by a fixing means.

8. The coconut of claim 7, wherein the fixing means consists of at least one of an adhesive, an adhesive tape, a wrapping material, and a fastening material to fix the lid on the coconut without interfering with the shell of the coconut.

9. A method for preparing a coconut having an assembly for accessing coconut water of the coconut, the method comprising: a. removing an outer husk covering a germination pore of the coconut; b. placing the assembly of claim 1 on the germination pore of the coconut so that the plunger lance of the assembly is above the germination pore, the plunger lance is configured to pierce the germination pore of the coconut after the lid is placed and fixed on the germination pore of the coconut; c. fixing the lid of the assembly on the germination pore of the coconut by a fixing means, wherein the lid has a lowermost surface of the lid resting on the coconut without penetrating into the coconut during use of the assembly to access the coconut water therein and wherein the fixing means fixes the assembly on the coconut without the assembly penetrating, destroying or interfering with a shell of the coconut; d. depressing the upper surface of the plunger collar to move the plunger lance into the coconut to move the plunger into a pressed position with the lower surface of the plunger collar directly contacting the lid; and e. creating a hole through the coconut, the hole sufficient to pass the coconut water out of the coconut through the plunger bore while the plunger remains inserted in the pressed position.

10. The method of claim 9, wherein the fixing means consists of at least one of an adhesive, an adhesive tape, a wrapping material, and a fastening material applied to fix the lid on the germination pore of the coconut without interfering with the shell of the coconut.

11. An assembly for accessing coconut water of a coconut comprising:
   a plunger having a plunger collar perpendicularly mounted to a plunger lance, the plunger collar extending outward from a longitudinal axis of the plunger lance at one end thereof, the plunger collar having an upper surface permitting a user to depress the upper surface to cause the plunger lance to penetrate the coconut, the plunger collar having a lower surface, extending from the plunger lance, a plane of the lower surface being perpendicular to the plunger lance;
   a plunger bore extending longitudinally through the plunger collar and the plunger lance, the plunger lance having a length sufficient to create a hole through the coconut by pressing the plunger lance into the coconut to a pressed position, the hole sufficient to pass the coconut water out of the coconut through the plunger bore while the plunger remains inserted in the pressed position;
   a lid having a lid bore for receiving and housing a tip of the plunger lance, the lower surface of the plunger collar directly contacting the lid when the plunger is fully inserted into the coconut through the lid; and
   a stopper clip for holding the plunger lance in order to prevent the tip of the plunger lance in the lid bore from puncturing the coconut, wherein
   the plunger lance is configured to pierce a germination pore of the coconut after the lid is placed and fixed on the germination pore of the coconut;
   a lowermost surface of the lid rests on the coconut without penetrating into the coconut during use of the assembly to access the coconut water therein; and
   the lid is secured to the coconut without the assembly penetrating, destroying or interfering with a shell of the coconut.

12. The assembly of claim 11, wherein the stopper clip is tethered to the plunger collar of the plunger.

13. The assembly of claim 11, wherein the plunger bore is configured to permit a straw to be inserted therethrough.

14. The assembly of claim 11, wherein the stopper clip is a tubular member, open on each of a first open end and a second open end, with a cut formed along a length thereof, from the first open end to the second end.

15. The assembly of claim 11, wherein the lid is secured to the coconut by at least one of an adhesive, an adhesive tape, a wrapping material, and a fastening material without penetrating, destroying or interfering with a shell of the coconut.

16. The assembly of claim 15, further comprising aligning the opening of the lid with the germination pore of the coconut.

* * * * *